April 25, 1967　　　　H. H. ZEISS　　　　3,316,283
PREPARATION OF BIS(ARENE) METAL COMPOUNDS
Filed Oct. 16, 1956

$C_6H_5MgBr + CrO_2Cl_2$ (ETHER SOLVENT)

REACTION PRODUCT

HYDROLYSIS

HYDROLYSIS MIXTURE

- SOLUTION I, ETHER
- INSOLUBLE SOLIDS
- SOLUTION II, $H_2O$

SOLUTION I → EXTRACTED WITH $H_2O$ → $H_2O$ / ETHER
$H_2O$ → EXTRACTED 5x WITH $CHCl_3$ → $CHCl_3$

INSOLUBLE SOLIDS → EXTRACTED WITH $CHCl_3$ → SOLUTION III $CHCl_3$ → EXTRACTED 3x WITH $H_2O$ → $CHCl_3$ / $H_2O$

SOLUTION II → EXTRACTED 3x WITH $CHCl_3$ → $CHCl_3$ / $H_2O$
$CHCl_3$ → EXTRACTED 3x WITH $H_2O$

COMBINED $CHCl_3$ → EXTRACTED 2x WITH $H_2O$ → $CHCl_3$ / $H_2O$ $\phi\phi Cr^+\phi\phi$ SALTS 22.5 g. VIII

COMBINED $H_2O$ $H_2O$ SPLIT:
- Na B$\phi_4$ → $\phi Cr^+\phi$ IV $\overline{B}\phi_4$ 0.2 g.
- PICRIC ACID → $\phi Cr^+\phi$ V PICRATE — 0.8 g.

$H_2O$ SPLIT:
- Na B$\phi_4$ → $\phi Cr^+\phi\phi$ VI $\overline{B}\phi_4$ 0.6 g.
- PICRIC ACID → $\phi Cr^+\phi\phi$ VII PICRATE — 7.6 g.

Na B$\phi_4$ → $\phi Cr^+\phi$ IX $\overline{B}\phi_4$ 0.5 g.

$H_2O$ SPLIT:
- PICRIC ACID → $\phi Cr^+\phi$ X PICRATE — 10. g. → RECRYSTALLIZE FROM ABOUT 100 ml. ACETONE → PURE X

IV = IX
V = X
$\phi = C_6H_6$
$\phi\phi = C_6H_5-C_6H_5$

INVENTOR.
HAROLD H. ZEISS
BY Joseph D. Kennedy
ATTORNEY

3,316,283
PREPARATION OF BIS(ARENE)METAL COMPOUNDS

Harold H. Zeiss, Dayton, Ohio, assignor to Monsanto Company, a corporation of Delaware
Filed Oct. 16, 1956, Ser. No. 616,224
11 Claims. (Cl. 260—429)

The present invention is directed to a method for forming and isolating a complex of a Group VI metal with two molecules of an aromatic compound by a process which involves reacting a halide of a Group VI metal with an organo-metallic derivative of said aromatic compound, and isolating the resulting bis(arene) metal complex from the reaction mixture.

In one aspect the invention is particularly directed to the preparation of bis(arene)chromium compounds by reacting aryl Grignard reagents with chromyl chloride or chromic chloride, hydrolyzing the resulting Grignard complex, and isolating water-soluble bis(arene)chromium compounds therefrom; the flow sheet of the accompanying drawing illustrates a suitable procedure for carrying out the process.

In another aspect, the invention is directed to the preparation of bis(arene)molybdenum compounds by reacting molybdenum pentachloride or molybdenum tribromide with aryl Grignard reagents or aryl lithium compounds, hydrolyzing the resulting complex, and isolationg water-soluble bis(arene)molybedenum compounds therefrom. Similarly, the invention is also directed to the preparation of bis(arene)tungsten compounds by reacting tungsten hexachloride or tungsten hexaphenolate with aryl Grignard reagents or aryl lithium compounds, and isolating the water-soluble hydrolysis products thereof.

The present invention is further directed to bis(benzene)chromium compounds as novel compounds having valuable utility as chrome-plating agents and as intermediates for the production of other organic compounds and polymers containing chromium.

In another aspect, the invention involves the use of bis(arene)chromium compounds and other bis(arene) compounds of Group VI metals in the plating of metals and other materials.

In yet another aspect, the invention is directed to a process of reducing bis(arene)chromium salts to compounds containing non-ionic chromium, by the use of aqueous hypophosphorous acid.

Group VI metals are those elements in Group VI–B of the periodic chart of the elements (Lange's Handbook of Chemistry, Sixth Edition, page 58).

An object of the present invention is to provide a generally applicable method of producing bis(arene)chromium compounds and other bis(arene) compounds of Group VI metals in which the arene group can contain various substituents. A further object of the present invention is to provide a method of preparing bis(arene) chromium compounds from the corresponding aryl Grignard reagents. It is a further object to provide bis(benzene)chromium compounds having valuable utility for many purposes.

The bis(arene) metal compounds and bis(benzene) chromium compounds, e.g. $(C_6H_6)_2Cr°$, prepared by the process of the present invention are believed to be complex molecular compounds, and may be referred to herein as "complexes," "complex compounds," or simply as "compounds."

Hein and others have heretofore reacted phenylmagnesium-bromide with anhydrous chromic chloride, but these workers did not attempt to isolate any material from the aqueous phase resulting from hydrolysis of their reaction product, and prior to the present work the isolation of water-soluble bis(benzene)chromium complexes from the reaction of a phenyl Grignard with a chromium halide had not been reported.

The process of the present invention is adaptable to converting any aryl halogen compound capable of forming a Grignard reagent in the normal manner, into a chromium complex containing two arene groups for each chromium atom. As examples of such aryl halogen compounds, the following can be named: phenyl bromide, 1,4-dibromobenzene, 1,2-dibromobenzene, p-bromotoluene, p-iodotoluene, p-bromostyrene, p-bromo-α-methylstyrene, bramoesitylene, phenyl chloride, α-bromonaphthalene, β-bromonaphthalene, α-bromoanthracene, β-bromophenanthrene, p-diethylaminobromobenzene m - bromotoluene, o - bromotoluene, 1 - bromo-4-chlorobenzene, α-bromotetralin, pentamethylbromobenzene, m-fluorobromobenzene, p-ethylbromobenzene, p-butylbromobenzene, p-isobutylbromobenzene, p-sec-butylbromobenzene, p - t - butylbromobenzene, p - hexylbromobenzene, p-phenylbromobenzene, etc.

As will be apparent from the above compounds, the method of the present invention is applicable to halogenated aryl hydrocarbons and to other aryl halogen compounds which do not contain active hydrogen atoms, unsaturated carbon to oxygen bonds, or other functional groups capable of destroying or reacting with Grignard reagents. The above compounds are also applicable in the preparation of bis(arene)Mo and bis(arene)W compounds.

While dihalogen compounds are capable of forming di-Grignard compounds, the formation of the Grignard reagent from such compounds can also be conducted to cause Grignardization of only one halogen group. Both the mono- and the di-Grignard reagents are useful in forming chromium complexes by the procedure of the present invention. The presence of a free halogen in the aryl Grignard reagents, and in the resulting chromium complexes will have value in the preparation of further derivatives as will be described hereinbelow. The above-named compounds will form Grignard reagents in the normal manner. While bromine is the preferred Grignard halogen, iodine and chlorine are also useful, although the formation of aryl magnesium chlorides sometimes requires rather vigorous reaction conditions. The aryl fluorides can theoretically be used in the preparation of Grignard reagents for the present process; however, the aryl fluorides are usually less reactive than other aryl halides, and therefore the use of aryl fluorides is ordinarily impractical. Tertiary amino groups in the aryl compounds do not interfere in the preparation of the Grignard reagents or in the formation of the metal complexes. Unsaturated aliphatic hydrocarbon substituent groups will not interfere in the preparation of the Grignard reagents or in the preparation of the metal complexes by the reaction of the Grignard reagents with chromic chloride; as will be explained hereinbelow, vinyl-aryl groups will be especially valuable in the preparation of polymeric derivatives of the bis(arene)chromium compounds.

The above-named aryl halogen compounds undergo Grignardization in the normal manner, and then are transformed to the corresponding bis(arene)chromium compounds, i.e., each of the aryl halogen compounds can be converted into a bis(aryl-H)chromium complex. A few illustrative examples of such bis(arene)chromium compounds are:

bis(benzene)chromium
bis(diphenyl)chromium
bis(p-chlorobenzene)chromium
bis(p-sec-butylbenzene)chromium
bis(vinylbenzene)chromium bis(2,4-divinylbenzene)chromium
bis(naphthalene)chromium
bis(bromomagnesiumbenzene)chromium, etc.

While in the above neutral compounds, chromium is presumed to be in a non-ionic state, it will be appreciated that each of the compounds can also possess an ionic charge and exist as a salt with various anions such as Cl⁻, I⁻, tetraphenylboron⁻, the picrate anion, $$[Cr(CNS)_4(NH_3)_2]^-$$

$ClO_4^-$, etc. In fact, such salts are usually intermediates in the separation procedure which I employ. For example, reaction of the hydrolyzate following the Grignard reaction with KI produces the iodide salt. While the anionic portions of such salts are ordinarily selected to give the salts particular crystallizing properties, it will be appreciated that salts of bis(arene)chromium can be formed in general with anions of organic and inorganic acids, usually by reacting a salt of the chosen acid with a bis(arene)chromium salt. For example, in addition to the above-named anions, such anions as $SO_4^=$, $HSO_4^-$, $CH_3COO^-$, $C_6H_5COO^-$, etc. are applicable. When the bis(arene)chromium compounds are referred to herein, either generically or specifically, it will be understood that the various salts of such compounds are also contemplated.

In the process of my invention the aryl Grignard reagents are reacted with a chromium halogen compound. This reaction can take place under the usual conditions for Grignard reactions. It is necessary, of course, to exclude air and moisture in order to avoid destruction of the Grignard reagents. The normal Grignard solvents or diluents, e.g., ethers, dioxane, benzene, toluene, Diethyl Cellosolve (diethyl ether of ethylene glycol), tetrahydrofuran, tertiary amines, etc., can be used in the reaction. Solvents which unduly interfere with or retard the reaction, e.g., $CCl_4$, should be avoided. The reaction is ordinarily conducted at low temperatures, e.g., from the temperature of Dry Ice to 0° C., to insure against decomposition of the product. However, higher temperatures, e.g., up to room temperature (20° C.) or higher can be used.

Chromyl chloride ($CrO_2Cl_2$) is a very suitable chromium halide for use in my invention. Anhydrous chromic chloride also works very well. Other chromous and chromic halides can also be used, particularly the bromides, iodides and chlorides; for reasons of economy the chlorides will ordinarily be employed, e.g., $CrCl_2$, $CrCl_3$ and $CrO_2Cl_2$. The chromium compounds must be anhydrous to avoid undue destruction of the Grignard reagent.

Halides of chromium, particularly chromyl chloride, attack ethers and other organic solvents to some extent. It is therefore advisable to add these reagents in small increments to the solution containing the aryl Grignard reagent, or to use some other procedure to avoid prolonged contact of the chromium halides with the organic solvents. While it might be possible to conduct the reaction in the absence of solvent, the solvents are useful as diluents to modify the speed of the reaction.

The addition of the chromyl chloride usually requires an hour or two. Upon completion of the reaction, the Grignard complex is ordinarily treated with cold water (preferably ice) and acidified with dilute sulfuric acid. However, other known methods of hydrolyzing Grignard complexes can also be used; for example, hydrochloric acid, phosphoric acid, ammonium chloride, or other mineral acids or acid salts can be used for the acidification.

Following the hydrolysis procedure, the aqueous phase of the reaction mixture is separated from the organic solvent phase, and water-soluble bis(arene)chromium complexes are then converted to water-insoluble salts which are then separated from the aqueous phase.

While the structure of the bis(arene)chromium compounds has not been unequivocally established, it is believed that the compounds are best represented by the following "sandwich" structure:

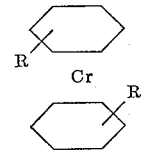

in which the chromium atom is attached to the benzene rings by non-localized covalent bonds, and R is hydrogen or a non-interfering substituent. Of course, the compounds and the methods of preparing them are valuable for the reasons enumerated herein, regardless of what the structure of the compounds may be.

When R in the above formula is a vinyl group, the compound will be useful in preparing chromium-containing polymeric derivatives of either the linear or the three-dimensional type by ordinary styrene polymerization procedures. In preparing cross-linked structures, divinyl benzene or similar materials can be used as cross-linking agents. In the alternative, it will be possible to prepare cross-linked homopolymers by the use of bis(arene)chromium compounds in which the arene group contains two or more vinyl substituents. When R in the above compounds is chlorine, the possibility of a variety of substitution and replacement reactions to produce derivatives having value for many purposes is presented. For example, replacement of the chlorine with hydroxyl by known procedures produces a phenol. Reaction of such a phenol with formaldehyde can be used to prepare a phenol-formaldehyde resin, of either the novolak or resol type, in which chromium is an integral part. The use of carboxyl, amino, —MgBr, and a number of other active substituents will make possible a wide variety of reactions, e.g., the preparation of polyamide, polyester and polyanhydride resins, as will be apparent to those skilled in the art, and will result in the preparation of many other useful derivatives.

The presence of chromium in polymers prepared from bis(arene)chromium compounds will have a marked effect upon many properties of the polymers such as electrostatic, magnetic, electrical, biological and thermal properties, as can be understood by those skilled in the art.

In addition to their value as intermediates in the preparation of useful derivatives, the bis(arene)chromium compounds are useful per se as chromium plating agents. It is only necessary to contact a heated metal surface with the bis(arene)chromium compound in the vapor phase, the metal surface being at a temperature above the decomposition temperature of the compound, say 300 to 600° C., to cause chromium to plate out on the metal. It can be seen that such agents will be of great value in gas-phase plating procedures. A stream of the vaporized bis(arene)chromium compound in nitrogen or other inert gas can be conducted over the surface of the metal to be plated until a protective layer of chromium having the desired thickness is obtained. Layers of 0.001 to 0.002 of an inch are ordinarily satisfactory. Vapors of the bis(arene)chromium compounds can be generated by ordinary thermal evaporation procedures, with the use of vacuum if desired; bis(benzene)chromium vaporizes at about 150° C./20 mm. Hg. While it is convenient to use a stream of the bis(arene)chromium compound in a gas as the contacting medium, the hot material to be plated can alternatively simply be placed in a position in which vapors from a bath of bis(arene)chromium compound will contact it. It is also possible to simply contact hot metal with the bis(arene)chromium compound in the solid or liquid state, thereby vaporizing the organic portion of the compound and leaving a deposit of chromium on the metal. In procedures similar to the above procedures, bis(arene)Mo and bis(arene)W compounds can be used to plate metals and other materials with molybdenum and tungsten to obtain useful molybdenum and tungsten plated products.

As is well known, chrome-plating of metals provides a surface having great resistance to abrasion and corrosion. While any metals can be thus protected, chrome plating is usually most valuable in the protection of iron, steel, nickel, copper and tin metals and alloys. In addition to plating metals, the present chrome-plating process can be used to chrome plate other materials if desired, e.g., glass, ceramic materials, siloxane materials, etc.

For the chrome-plating procedures, any of the bis(arene)chromium compounds can be used, the bis(benzene)chromium compounds being preferred. For example, all of the bis(arene)chromium compounds named hereinabove are satisfactory. The bis(arene)chromium compounds have the volatility required to "carry" chromium in the vapor state, and the bonds between the chromium and the organic portions of the compounds are readily broken at higher temperatures.

The bis(arene)chromium compounds of the present invention will also be valuable in various biological and toxicological applications and as polymerization catalysts in the polymerization of various vinyl and other type monomers.

The following example will serve to illustrate this invention, but the invention is not limited thereto.

*Example*

A solution of phenylmagnesium bromide was prepared from 280 grams of bromobenzene (1.8 mols), 60 grams of magnesium and 1.3 liters of anhydrous ether. The Grignard solution so obtained was filtered through glass wool (under nitrogen). A solution of chromyl chloride, 32.5 grams (0.21 mole), in 500 ml. of benzene was added dropwise to the Grignard solution (under nitrogen) at −35 to −50° C. The addition required two hours, during which constant stirring was maintained. The chromyl chloride solution in benzene was prepared portion-wise, each portion (ten in all) being prepared immediately prior to use, as benzene and chromyl chloride undergo slow reaction with one another.

After coming to room temperature, the reaction mixture was hydrolyzed by the addition of small pieces of ice, with stirring and cooling in an ice-salt bath. The mixture was next acidified with cold, dilute sulfuric acid, and the ether layer (I) and aqueous layer (II) of the mixture were separated by means of a separatory funnel, and the separated layers were filtered. The insoluble orange-yellow material which remained on the filter was extracted with chloroform (extract, solution III). Most of the bis(arene)chromium complex was in the aqueous layer (II) as can be seen from the flow sheet of the accompanying drawing. The aqueous layer was extracted three times with chloroform, and was then split into two parts; one part was treated with a large excess of warm concentrated aqueous picric acid solution, causing the picrate salts of bis(benzene)chromium (X) to crystallize in one to two hours; an excess of picric acid can be insured by adding the picric acid until no more precipitation occurs.

The picrate X was recrystallized from acetone, giving orange needles (3.9 grams) which decompose explosively between 135–145° C.

*Analysis.*—Calc'd for $C_{18}H_{14}O_7N_3Cr$: C, 49.55; H, 3.23; N, 9.63. Found: C, 49.30; H, 3.36; N, 9.36.

Upon shaking bis(benzene)chromium picrate (X) in a mixture of benzene and 50% aqueous hypophosphorous acid under nitrogen, the compound is reduced to bis(benzene)Cr° and extracted into the benzene layer. Evaporation of the benzene under vacuum leaves the bis(benzene)Cr°, which is purified by sublimation at 150°/20 mm., and is obtained as dark, glistening octahedrons, M.P. 282–284°.

On the flow sheet, as is apparent, the treatment of the individual aqueous ether and chloroform solutions can be followed proceeding down the flow sheet. The symbol "6" on the flow sheet indicates benzene $(C_6H_6)$, "φφ" indicates diphenyl $(C_6H_5—C_6H_5)$, and $x$ equals times, i.e., the number of portions of extracting medium which were used.

A small amount of the recrystallized picrate of bis(benzene)chromium (pure X) was dissolved in acetone, diluted with water to incipient precipitation and then treated with an aqueous solution of sodium tetraphenyl boron. The precipitate was separated by centrifugation, washed twice with acetone, thrice with ether and then dried in vacuo. The precipitate can be recrystallized from acetone.

*Analysis.*—Calc'd for $C_{36}H_{32}BCr$: C, 81.98; H, 6.11. Found: C, 82.06; H, 6.27

The other part of the aqueous layer II which was divided into two parts following the chloroform extraction, was treated with sodium tetraphenyl boron to produce bis(benzene)chromium tetraphenylboron IX.

In a similar manner, extraction of the ether solution I with water, followed by extraction of the aqueous extract solution with chloroform, provided an aqueous solution from which a small amount of bis(benzene)chromium was crystallized in the form of its tetraphenylboron and picrate salts (IV and V). Work-up of that part of the hydrolyzed reaction mixture which was more chloroform-soluble than water-soluble produced a small amount of bis(diphenyl)chrominum salts (VIII), while from the materials exhibiting both water and chloroform solubility it was possible to isolate a phenyl-diphenyl-chromium compound in the form if its tetraphenylboron and picrate salts (VI and VII).

As is apparent from the foregoing, the treatment of the aqueous layer resulting from the hydrolysis of the chromyl chloride-phenylmagnesium bromide reaction product in a particular manner involving the proper selection of solvents and the formation of salts having the proper crystallization proclivities makes it possible to isolate bis(benzene)chromium compounds from the stated aqueous layer. While the flow sheet illustrates a particular procedure, it will be realized that the most important factor in the isolation procedure is the water-solubility of the bis(arene)chromium complexes resulting from the hydrolysis procedure, and any process utilizing this factor is within the purview of the present invention. While chloroform extraction of the aqueous solution II is advantageous if a pure bis(benzene)chromium is desired, it is not necessary if mixture with a phenyl-diphenyl-chromium is not undesirable for a particular purpose.

Chloroform, ether and water have been found to be a useful combination of solvents for isolation of bis(arene)-chromium compounds. However, now that it has been discovered that the bis(arene)chromium complexes are present in the aqueous layer resulting from the hydrolysis of the chromyl chloride-arylmagnesium halide reaction, it will be possible to find other solvent combinations for the isolation of the bis(arene)chromium compounds. In some cases in which the arene is highly substituted it will be desirable to modify the isolation procedures to some degree, as for example, when the arene is polycyclic, the water solubility of the bis(arene)chromium complex is lessened and the extraction procedures will be modified accordingly.

The bis(arene)chromium salts can be converted to bis(arene)chromium compounds possessing no ionic charge on the chromium by reduction procedures. A preferred reduction procedure is agitation of the salt suspended in a mixture of benzene or other organic solvent, and 50% aqueous hypophosphorous acid. The use of benzene and alkaline hydrosulfite is also effective. In these procedures the Cr°— complex is extracted into the benzene phase as reduction proceeds. Other chemical reducing agents can be used, and electrolytic procedures are also applicable.

In the above reaction of aryl Grignard reagents with chromyl chloride, an excess of Grignard reagent is generally used. Such excess can vary considerably, for example, from 5 to 10 moles of Grignard reagent for each mole of chromyl chloride. In general, from about 2 up to 15 moles of Grignard reagent are used per mole of chromium halogen compound. For example, about 5 moles of aryl Grignard reagent can be used for each mole of chromium trichloride.

Although the description of the preparation of bis(arene)chromium compounds herein is particularly directed to the reactions of aryl Grignard reagents with chromium halides, it will be appreciated that other organo-metallic agents can be used in place of the Grignard reagents. For example, aryl lithium, zinc, and cadmium compounds can be used under certain conditions, although the aryl Grignard reagents are preferred.

While the discussion of the specific illustrative procedures herein is particularly concerned with the production of bis(arene)chromium compounds by reacting chromium halides with aryl Grignard reagents, it will be realized that halides of other Group VI metals, particularly those metals of atomic number no greater than 74, i.e., tungsten and molybdenum, can be used in the same manner in reactions with aryl Grignard reagents and other aryl-metallic agents to prepare corresponding bis(arene)W and bis(arene)Mo compounds.

I claim:

1. A method of preparing bis(arene) compounds of Group VI metals which comprises reacting an aryl-metallic reagent with a halide of a metal of Group VI of the periodic chart of the elements, hydrolyzing the resulting complex, and isolating a water-soluble bis(arene) metal compound from the resulting mixture.

2. The method of claim 1 in which the Group VI metal is tungsten.

3. The method of claim 1 in which the Group VI metal is molybdenum.

4. A process of preparing bis(arene)chromium compounds which comprises reacting an aryl-metallic reagent with a chromium halide, hydrolyzing the resulting complex, and isolating a water-soluble bis(arene)chromium compound from the resulting mixture.

5. A method of preparing bis(arene)chromium compounds which comprises reacting an aryl Grignard reagent with a chromium halide, hydrolyzing the resulting complex and isolating a water-soluble bis(arene)chromium compound from the resulting mixture.

6. A method of preparing a bis(benzene)chromium compound which comprises reacting a phenyl Grignard reagent with chromyl chloride in an organic solvent, hydrolyzing the resulting complex, and isolating a bis(benzene)chromium compound from the resulting hydrolyzate.

7. The method of claim 6 in which the bis(benzene) chromium compound is removed from the organic solvent dissolved in an aqueous phase, and is isolated in the form of a water-insoluble salt.

8. A method of preparing a bis(benzene)chromium compound which comprises reacting a phenyl Grignard reagent with chromic chloride in an organic solvent, hydrolyzing the resulting complex, and isolating a bis(benzene)chromium compound from the resulting hydrolyzate.

9. A process of preparing bis(benzene)chromium compounds which comprises reacting an aryl Grignard reagent of the formula RMgX in which R is an aryl radical and in which X is a Grignard halogen, with chromyl chloride in an ether solvent at temperatures below 0° C., hydrolyzing and acidifying the resulting complex, separating the aqueous phase of the mixture from the organic solvent phase, extracting the aqueous phase with chloroform, forming a water-insoluble salt of the bis(arene)chromium compound in the aqueous phase, and crystallizing said salt from said phase.

10. The process of claim 9 in which the salt is then reduced to the free bis(benzene)chromium complex by treatment with a reducing agent.

11. The process of claim 10 in which the salt is the picrate salt and it is reduced by the use of hypophosphorous acid.

References Cited by the Examiner
UNITED STATES PATENTS

| | | | |
|---|---|---|---|
| 2,386,256 | 10/1945 | Morris | 260—438 |
| 2,407,265 | 9/1946 | Fox | 260—438 |
| 2,689,807 | 9/1954 | Kempe et al. | 117—107 |
| 2,759,848 | 8/1956 | Sullivan | 117—107 |
| 3,231,593 | 1/1966 | Hafner et al. | 260—429 |

OTHER REFERENCES

"Abstract 126th Meeting, American Chemical Society," pp. 29–30, Sept. 14, 1954.

Cotton, Chemical Reviews, vol. 55, February–June 1955, pp. 563–570.

J.A.C.S., vol. 78, No. 22, November 1956, p. 5959.

J. Inorg. Nucl. Chem., vol. 3, p. 104 (1956).

The Van Nostrand Chemist's Dictionary, D. Van Nostrand Co., New York 1953, pp. 40–44.

"Yale Scientific Mag.," vol. 29, pp. 14 to 16 (January 1955).

TOBIAS E. LEVOW, *Primary Examiner.*

RICHARD D. NEVIUS, L. D. ROSDOL, ABRAHAM WINKELSTEIN, *Examiners.*

W. L. JARVIS, B. R. PADGETT, R. S. AULL, A. ISAACS, A. GOLIAN, E. C. BARTLETT, H. M. S. SNEED, *Assistant Examiners.*